(12) United States Patent
Gledhill et al.

(10) Patent No.: US 10,072,783 B2
(45) Date of Patent: Sep. 11, 2018

(54) PIPE CONNECTION FITTING

(71) Applicant: Reliance Worldwide Corporation (Aust.) Pty. Ltd., Melbourne, Victoria (AU)

(72) Inventors: Jeremy Gledhill, Dandenong South (AU); William Vernon Kluss, Woombye (AU)

(73) Assignee: RELIANCE WORLDWIDE CORPORATION (AUST.) PTY. LTD., Melbourne (AU)

( * ) Notice: Subject to any disclaimer, the term of this patent is extended or adjusted under 35 U.S.C. 154(b) by 260 days.

(21) Appl. No.: 15/105,389

(22) PCT Filed: Dec. 17, 2014

(86) PCT No.: PCT/AU2014/050427
§ 371 (c)(1),
(2) Date: Jun. 16, 2016

(87) PCT Pub. No.: WO2015/089583
PCT Pub. Date: Jun. 25, 2015

(65) Prior Publication Data
US 2016/0327196 A1 Nov. 10, 2016

(30) Foreign Application Priority Data
Dec. 19, 2013 (AU) .................. 2013904959

(51) Int. Cl.
*F16L 33/00* (2006.01)
*F16L 37/091* (2006.01)

(52) U.S. Cl.
CPC ......... *F16L 37/091* (2013.01); *F16L 2201/10* (2013.01)

(58) Field of Classification Search
CPC .. F16L 37/091; F16L 37/0915; F16L 2201/10
(Continued)

(56) References Cited

U.S. PATENT DOCUMENTS 3,724,882 A * 4/1973 Dehar ............... F16L 37/05
285/243
3,743,326 A 7/1973 Courtot et al.
(Continued)

FOREIGN PATENT DOCUMENTS

| AU | 2014203586 A1 | 1/2015 |
| EP | 0897082 A1 | 2/1999 |
| JP | 2002005373 A | 1/2002 |

OTHER PUBLICATIONS

Written Opinion of the International Searching Authority issued in PCT/AU2014/050427 dated Feb. 12, 2015, 5 pages.

*Primary Examiner* — Aaron M Dunwoody
(74) *Attorney, Agent, or Firm* — Bush Intellectual Property Law; Kenneth M. Bush (57) ABSTRACT

A connection fitting (10) for a pipe, including a tubular body (12), an O-ring (14) mountable on outer side of tubular body (12), a substantially tubular collet (16) having a first end and a second end and having a memory, a substantially annular and resilient grab ring (20) for gripping the outer side of a pipe inserted into the collet (16), a substantially tubular spacer ring (22) locatable on the free side of the grab ring (20), a collet retainer (18), and a tubular protection ring (24) locatable within the spacer ring (22), wherein when the collet retainer (18) engages with the collet (16) and causes the collet (16) to lock onto the tubular body (12) apertures (66) in the collet retainer (18) permit portions of the protection ring (24) to be seen after connection of a pipe to the connection fitting (10) is completed.

4 Claims, 9 Drawing Sheets

(58) Field of Classification Search
USPC .................................. 285/93, 340, 322, 243
See application file for complete search history.

(56) References Cited

U.S. PATENT DOCUMENTS

| | | | |
|---|---|---|---|
| 3,837,687 A | 9/1974 | Leonard | |
| 4,386,796 A | 6/1983 | Lyall et al. | |
| 4,422,673 A | 12/1983 | Blackford et al. | |
| 4,632,437 A | 12/1986 | Robson et al. | |
| 4,664,427 A | 5/1987 | Johnston | |
| 4,807,911 A | 2/1989 | Short | |
| 5,046,763 A | 9/1991 | Martucci et al. | |
| 5,160,179 A | 11/1992 | Takagi | |
| 5,172,943 A * | 12/1992 | Shimada | F16L 33/227 |
| | | | 285/102 |
| 5,419,594 A | 5/1995 | Nelms | |
| 5,474,336 A | 12/1995 | Hoff et al. | |
| 5,511,830 A | 4/1996 | Olson et al. | |
| 5,584,513 A | 12/1996 | Sweeny et al. | |
| 5,673,945 A | 10/1997 | Olson | |
| 5,681,061 A | 10/1997 | Olson | |
| 5,692,785 A | 12/1997 | Wartluft et al. | |
| 5,791,698 A | 8/1998 | Wartluft et al. | |
| 5,921,588 A * | 7/1999 | Vogel | F16L 19/086 |
| | | | 285/23 |
| 5,947,532 A | 9/1999 | Lorenz | |
| 5,975,587 A | 11/1999 | Wood et al. | |
| 6,039,361 A | 3/2000 | Meli | |
| 6,050,613 A | 4/2000 | Wartluft | |
| 6,065,779 A | 5/2000 | Moner et al. | |
| 6,155,607 A | 12/2000 | Hewitt et al. | |
| 6,349,978 B1 | 2/2002 | McFarland et al. | |
| 6,371,531 B1 | 4/2002 | Robison | |
| 6,378,915 B1 | 4/2002 | Katz | |
| 6,511,099 B2 | 1/2003 | Bartholoma et al. | |
| 6,773,039 B2 | 8/2004 | Muenster et al. | |
| 6,824,172 B1 | 11/2004 | Komolrochanapom | |
| 7,032,932 B2 | 4/2006 | Guest | |
| 7,338,030 B2 | 3/2008 | Brown, III | |
| 7,354,079 B2 | 4/2008 | Rehder et al. | |
| 7,425,022 B2 | 9/2008 | Guest | |
| 7,455,328 B2 | 11/2008 | Chelchowski et al. | |
| 7,469,936 B2 | 12/2008 | Norman | |
| 7,530,606 B1 | 5/2009 | Yang | |
| 7,543,858 B1 | 6/2009 | Wang | |
| 7,644,955 B1 | 1/2010 | Komolrochanapom | |
| 7,686,346 B1 | 3/2010 | Buccicone et al. | |
| 7,850,208 B2 | 12/2010 | Greenberger | |
| 7,866,710 B2 | 1/2011 | Sheppard et al. | |
| 7,900,973 B2 * | 3/2011 | Herberg | F16L 13/142 |
| | | | 285/104 |
| 8,025,315 B2 * | 9/2011 | Schreckenberg | F16L 13/142 |
| | | | 285/248 |
| 8,052,177 B2 | 11/2011 | Irwin | |
| 8,205,915 B1 | 6/2012 | Crompton et al. | |
| 8,210,576 B2 | 7/2012 | Crompton | |
| 8,322,755 B2 | 12/2012 | Kluss et al. | |
| 8,327,871 B1 | 12/2012 | Franklin et al. | |
| D676,940 S | 2/2013 | Kluss et al. | |
| D676,941 S | 2/2013 | Kluss et al. | |
| D676,942 S | 2/2013 | Kluss et al. | |
| D676,943 S | 2/2013 | Kluss et al. | |
| 8,444,325 B2 | 5/2013 | Guest | |
| 8,480,134 B2 | 7/2013 | Crompton et al. | |
| D693,429 S | 11/2013 | Thibodeaux, Jr. | |
| 8,789,853 B2 | 7/2014 | Gershkovich et al. | |
| 8,844,981 B1 | 9/2014 | Crompton et al. | |
| D722,362 S | 2/2015 | Kluss et al. | |
| D722,363 S | 2/2015 | Kluss et al. | |
| 9,228,681 B2 | 1/2016 | Kluss | |
| 9,857,009 B2 * | 1/2018 | Ratschmann | F16L 37/091 |
| 2004/0262920 A1 * | 12/2004 | Le Quere | F16L 37/091 |
| | | | 285/340 |
| 2005/0035597 A1 * | 2/2005 | Bamberger | F16L 37/091 |
| | | | 285/340 |
| 2006/0108801 A1 | 5/2006 | Grosch | |
| 2008/136166 A1 | 6/2008 | Guest | |
| 2009/0026758 A1 | 1/2009 | Sanzone | |
| 2009/0127803 A1 | 5/2009 | Chelchowski et al. | |
| 2010/0287740 A1 | 11/2010 | Rigollet et al. | |
| 2011/0025054 A1 | 2/2011 | Kluss | |
| 2011/0309614 A1 | 12/2011 | Guest | |
| 2012/0104749 A1 | 5/2012 | Kang | |
| 2012/0153617 A1 | 6/2012 | Kay | |
| 2012/0235403 A1 * | 9/2012 | Giordano | F16L 37/091 |
| | | | 285/323 |
| 2012/0306118 A1 * | 12/2012 | Hayashi | B29C 45/44 |
| | | | 264/249 |
| 2013/0062877 A1 * | 3/2013 | Hayashi | F16L 37/091 |
| | | | 285/81 |
| 2013/0069361 A1 | 3/2013 | Cai et al. | |
| 2013/0106103 A1 | 5/2013 | Horsfall et al. | |
| 2013/0147189 A1 | 6/2013 | Horsfall et al. | |
| 2013/0207385 A1 | 8/2013 | Williams et al. | |
| 2014/0062078 A1 | 3/2014 | Weissmann | |
| 2014/0152002 A1 | 6/2014 | Crompton et al. | |
| 2016/0008965 A1 | 1/2016 | Gledhill et al. | |
| 2016/0018010 A1 | 1/2016 | Forrestal | |
| 2016/0033065 A1 | 2/2016 | Graham et al. | |
| 2018/0106400 A1 * | 4/2018 | Le Quere | F16L 17/02 |

* cited by examiner

PIPE CONNECTION FITTING

FIELD OF THE INVENTION

The present invention relates to plumbing and gas pipe connections. In particular the present invention relates to readily assembleable push fit connection fittings or couplings, in which a pipe, tube or conduit (hereinafter referred to as a tube) can be pushed into the connection fitting and be retained connected to the connection fitting by internal elements of the connection fitting.

BACKGROUND OF THE INVENTION

There are a considerable number of connection fittings or couplings for joining pipes or tubes to each other, for example, or to join appliances or accessories to tubes or pipes. In many instances these connection fittings are bulky and use a considerable amount of materials because of the need to provide room within the connection fitting for the assembly of the component. The connection fitting itself may be difficult to install because of its size and the space required to accommodate it.

Additionally, some connection fittings require the use of tools and/or additional components to properly seal or make secure the connection between the connection fitting and the tube or pipe. This can also create significant problems where space for the connection fitting is limited.

SUMMARY OF THE INVENTION

The present invention aims to ameliorate some or all of the aforementioned problems in providing a quick connect/disconnect connection fitting that grips the outside of a tube or pipe and seals on the inside of the pipe. It is intended that the connection fitting of the invention can be attached to or incorporated in other in-lined devices, such as valves and other equipment, as well as a plurality of connection fittings being incorporated in in-line joiners, whether straight-line, angle, or split, such as key-joints or Y-joints, or otherwise.

According to one aspect of the invention there is provided a connection fitting for a tube or pipe, including a tubular body having a first end and a second end, the bore of which extends from the first end towards the second end and which may be blind at the second end, the tubular body being provided on its outer side with a circumferential channel for receiving an O-ring and means for engaging with a collet, the outside diameter of the tubular body being receivable within the tube or pipe to which the connection is to be made; an O-ring mountable in said circumferential channel, the O-ring being adapted to enter into a sealing relationship with the inner side of a tube or pipe as the connection with that tube or pipe is effected; a substantially tubular collet having a first end and a second end and having a memory, so that the cross-section of portions of said collet are reversibly alterable, which collet engages by mean of engaging means provided adjacent its second end with engaging means provided on the outer side of the tubular body; a substantially annular and resilient grab ring for gripping the outer side of a tube or pipe inserted into the collet, the grab ring being locatable adjacent the first end of the collet; a tubular spacer ring locatable on the free side of the grab ring adjacent the first end of the collet; a collet retainer provided with engaging means which engages with the collet and which causes the collet to lock to the tubular body, said collet retainer locating the grab ring and the spacer ring adjacent the first end of the collet; and a tubular protection ring locatable within the spacer ring, the outside diameter and inside diameter of which protection ring at its first end are equal to the outside diameter and inside diameter of the tube or pipe to be connected to the connection fitting, the inside of the protection ring being chamfered at its second end to assist in the proper insertion of the tube or pipe into the connection fitting and onto the tubular body.

The outer surface of the tubular body, the inner and outer surfaces of the collet and the inner surface of the collet retainer preferably are circular in cross-section, but may be polygonal in cross-section, subject to the requirements that these surfaces are similarly contoured so that they can match up to enable stable engagement and that the circumferential channel on the outer side of the tubular body is such that the O-ring can enter into a sealing relationship with the inner side of a tube or pipe as the connection with the tube or pipe is effected. In such circumstances, the outer surfaces of the spacer ring, the grab ring and the protection ring would also be correspondingly polygonal in cross-section to enable matching with the collet and collet retainer.

A significant feature of the present invention is the use of a collet and collet retainer to hold and locate other components relative to the tubular body of the connection fitting. The collet and collet retainer, together with the O-ring, grab ring, spacer ring, protection ring and body, can be easily assembled to form a connection fitting, using basic hand tools. The combination of collet and collet retainer give the connection fitting strength to secure a pipe connection. The protection ring aids easy pipe insertion. The pipe, when inserted, prevents the collet from collapsing inwards and helps strengthen the pipe joint.

The invention envisages the use of a push connection fitting on a variety of pipes including, but not limited to, copper pipes, polyethylene pipes (PE), polybutylene pipes (PB), polyethylene raised temperature pipes (PE-RT), cross-linked polyethylene pipes (PEX), multi-layer pipes, e.g., cross-linked polyethylene-aluminium-cross-linked polyethylene pipes (PEX-AL-PEX), or chlorinated polyvinyl chloride pipes (CVPC). The connection fitting is designed to seal on the inside of the pipe, using an O-ring, and to grip the pipe on the outside, using a grab ring. The connection fitting can be connect only, or connect/disconnect, and can be a stand-alone fitting, or can be manufactured as part of an end connection for valves. It is to be understood that a plurality of connection fittings can be incorporated in the one device such as in-line joiners, T-joints and Y-joints. A range of different sized connections can be made so as to cover all conventional plumbing/gas pipe sizes.

DETAILED DESCRIPTION OF THE INVENTION

An advantage of the invention relates to the making of a pipe connection fitting quickly and economically. Preferably, the design of the connection fitting incorporates a plastic collet and stainless steel collet retainer. While other materials may be used, it is important that they be suitable for the uses to which the collet retainer is put. The preferred materials used in these components allow for simple cost effective manufacturing and assembly. The sealing of the pipe is performed by an O-ring on the tubular body which seals on the inside of the pipe. Sealing on the inside of the pipe allows the body and other components of the connection to be smaller in their diameters, which requires less material. This design allows lower cost material and lower manufacturing cost. The invention allows a more cost effective connection fitting to the market.

The tubular body can be composed of a thermoplastics material or a thermosetting plastics material. Alternatively, it may be composed of a metal or metal alloy, such as a brass. Preferably it is formed from a thermoplastics material (which is a relatively cheaper material than a metal alloy) by moulding, although a combination of moulding and machining may be used. The tubular body material is preferably a material which does not react with, or leach into, water or other fluids. The outside diameter of the tubular body is less than the inside diameter of the pipe to which connection is to be made so that the tubular body can pass within the open end of the pipe during the process of connection of the pipe to the connection fitting. The outer side of the tubular body (which may be substantially circular or polygonal in cross-section) is provided with a circumferential channel for receiving and retaining an O-ring and with means for engaging a collet, preferably in the form of a circumferential ramp terminating in a channel at or adjacent to the second end of the tubular body.

Preferably, the collet, which can be composed of a thermoplastics material and which is generally cylindrical (but which may be polygonal in cross-section), has a first plurality of, more preferably four, equally spaced slots opening at the second end of the collet and running through to a plurality of, more preferably four, collet tabs disposed towards the first end of the collet. This plurality of slots allows the collet to expand when it is pushed onto the circumferential ramp of the tubular body. The collet can then ride up the circumferential ramp and an inwardly extending flange on the inside of the collet at the second end of the collet engages and retracts into the circumferential channel at the second end of the tubular body. The collet and tubular body are locked together, at this stage of assembly. Preferably, the collet has a second plurality of, more preferably four, slots equally spaced and opening at the first end of the collet, the second plurality of slots being equally spaced between each collet tab and the first plurality of slots. The second plurality of slots allows the collet to collapse inwards as the collet retainer is attached. The collet tabs have ramps, assisting the collet to compress when the collet retainer passes over the first end of the collet. The plurality of tabs on the collet can subsequently be lined up with a plurality of corresponding slots in the collet retainer.

The collet retainer, which is generally cylindrical (but which may be polygonal in cross-section), preferably is made of stainless steel for strength. The inside diameter and outside diameter at the outer or first end of the collet retainer is reduced compared to the rest of the collet retainer by means of an inwardly extending shoulder. The collet retainer is provided with a plurality of slots, preferably four, spaced equidistantly around its circumference. The role of this plurality of slots is to engage the plurality of collet tabs and to prevent the collet from expanding and disengaging from the tubular body.

The O-ring is flexible and can be resiliently distorted from its normal annular configuration for the purpose of tubing a sealing relationship with the pipe. It can be formed from any suitable elastomeric material, such as synthetic rubber, for example, silicones or ethylene propylene diene monomer rubbers, thermoplastic elastomers, polyolefins, polyurethanes, etc. Preferably it is formed from a material that does not react with, or leach into, water. Positioning of the body and O-ring on the inside of the pipe gives the pipe internal support.

The grab ring can be formed of any suitable material. Stainless steel or spring steel can be used and are preferred materials, although brass alloys and copper may suffice. The grab ring can take the form of a substantially annular ring from which depends a plurality of radially inwardly extending projections or teeth, which in the assembled connection fitting are also directed towards the second end of the collet, i.e., towards the tubular body. These projections or teeth preferably are spaced equally about the grab ring. The grab ring can be split between adjacent projections or teeth.

The collet retainer locks the collet to the body. The tabs on the collet in turn lock the collet retainer, when the collet tabs click in to the slots on the collet retainer. The grab ring and spacer are inserted into the collet retainer, before it is attached to the collet. When the collet retainer is in the locking position on the collet, the tubular body, collet retainer, grab ring, and spacer ring are all contained as a stable assembly. The collet, collet retainer and grab ring give support to the outside of the fitting, resulting in a strong and secure connection.

The protection ring at its outer or first end has the same size outside diameter and inside diameter as the pipe to be connected to the connection fitting. The protection ring is designed to centre the collet to the tubular body, protect the O-ring from contamination, compress the O-ring when inserting the pipe and indicate when the pipe is fully inserted. The protection ring is designed with a large chamfer on its inner or second end. This chamfer allows the O-ring to be compressed when inserting the pipe. With the chamfer on the protection ring, there is no need to chamfer the open end of the pipe, which is advantageous. When the pipe is inserted to the fitting, the pipe pushes on the back of the protection ring and when the protection ring comes in contact with the O-ring the O-ring is compressed, allowing the pipe to follow over the O-ring. Preferably, the protection ring is bright in colour, for sighting the protection ring when the pipe is fully inserted. The appearance of this feature in the apertures in the collet and collet retainer indicates full pipe insertion. When the protection ring is inserted at this part of the assembly stage, the collet is unable to collapse and disengage from the collet retainer. When a connection is made, the pipe pushes the protection ring to the end of the fitting. The pipe takes the place of the protection ring to hold the collet open against the collet retainer. On completion of connection, the protection ring becomes the pipe depth indicator.

The invention allows for easy and quick pipe insertion. When using the correct pipe cutting tool on PEX or PEX-AL-PEX pipe, there is no requirement to chamfer the pipe. When connection is made with this fitting, the protection ring is designed with a chamfer, to provide O-ring compression when pipe is inserted.

Significant advantageous features of this invention include the operation of the collet, stainless steel collet retainer and the protection ring. The collet and collet retainer allow easy assembly in the manufacturing process and provide the strength and functionality of the connection fitting for pipe insertion. As mentioned previously, the protection ring has a number of functions, the combination of which also provides significant advantages.

The design of the connection on the invention can be incorporated into, or attached to, other in-line devices, such as valves and other equipment. The end connection can be integral to valves or other equipment. The size of the connection can be selected so that a range of connections cover all conventional and non-conventional plumbing and gas pipe sizes and almost all pipe materials.

The connection fitting is assembled substantially as follows: the O-ring is located in the O-ring engaging circumferential channel on the tubular body. The collet is then pushed onto the tubular body until it engages the ramp on the tubular body. Under continued pushing the forward portion of the collet rides up the ramp and a forward cross-section of the collet expands preferably by increased separation of forward portions of the collet due to forward opening collet slots. This expansion continues some until the collet reaches the collet engaging channel in the tubular body whereupon the forward cross-section of the collet ceases to expand and an internally directed flange at the forward end of the collet engages with and is located within the collet engaging channel on the tubular body. The spacer ring and grab ring are then placed inside the collet retainer with the spacer ring being located first within the collet retainer and then the grab ring. The collet retainer assembly is then located on the collect and pushed over the collet. This causes the rear or outer end of the collet to compress, preferably via the compression of rear portions of the collet due to slots opening towards the rear or outer end. Tabs on the collet, which are provided with ramps, assist in this procedure by making it easier to push the collet retainer assembly onto the collet. The collet retainer assembly is further pushed onto the collet until the inner end of the collet retainer meets an external flange provided at the inner end of the collet. The collet retainer assembly is rotated around the collet until tabs on the collet click into the collet retainer slots. The rear or outer end of the collet is then allowed to expand and return to its pre-compression state. As a result the collet retainer is locked onto the collet and this also locks the collect onto the tubular body. The protection ring is pushed into and located within the spacer ring within the collet retainer and is further pushed towards the tubular body until it reaches the grab ring in the collet retainer assembly. The connection fitting is now ready for insertion of a tube or pipe. Because the protection ring has the same internal and external diameters as the pipe which the connection fitting is intended, the grab ring can grab the protection ring and hold it in place until insertion of the pipe. When a pipe is inserted the pipe pushes on the outer end of the protection ring and moves it towards the tubular body. The protection ring is chamfered on its inner side and compresses the O-ring as it is pushed further towards the tubular body. This also permits the pipe to ride more easily over the O-ring. There is no need to chamfer the open end of the pipe. As further pushing of the protection ring continues because of further pushing of the pipe into the connection fitting, the protection ring travels further along the tubular body until it meets a ramp on the tubular body and can move no further. At this point the pipe is being inserted fully into the connection fitting. Apertures in the collet retainer and collet allow the protection ring to be seen. As the protection ring preferably is brightly coloured it can be readily identified and this indicates that the pipe has been fully inserted into the connection fitting.

BRIEF DESCRIPTION OF DRAWINGS

In order that the invention may be more clearly understood a preferred embodiment is hereinafter described and shown in the drawings in which.

DESCRIPTION OF PREFERRED EMBODIMENT

In the drawings the numeral 10 designates generally a pair of connection fittings according to a preferred embodiment of the invention, one of the connection fittings 10a being shown in the assembled form and the other 10b being shown in an exploded view. Here, the connection fittings 10a and 10b are integrated to form an in-line joining means. In the following description, comments will be limited to that part of the pair of connection fittings shown in the exploded view in FIG. 1, i.e., 10b.

Figure 1:
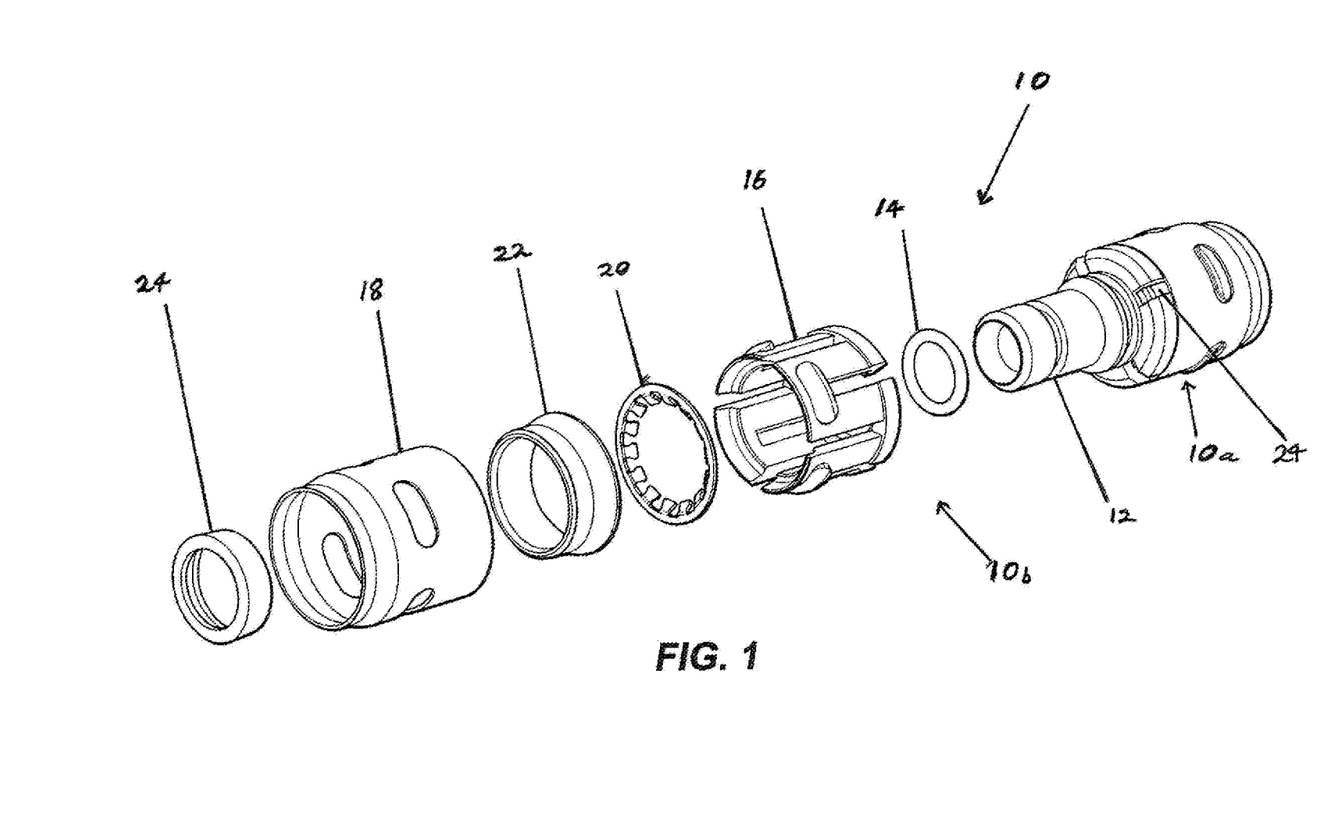
FIG. 1 is an exploded view of a preferred embodiment of the invention.
Figures 2, 3, 4:
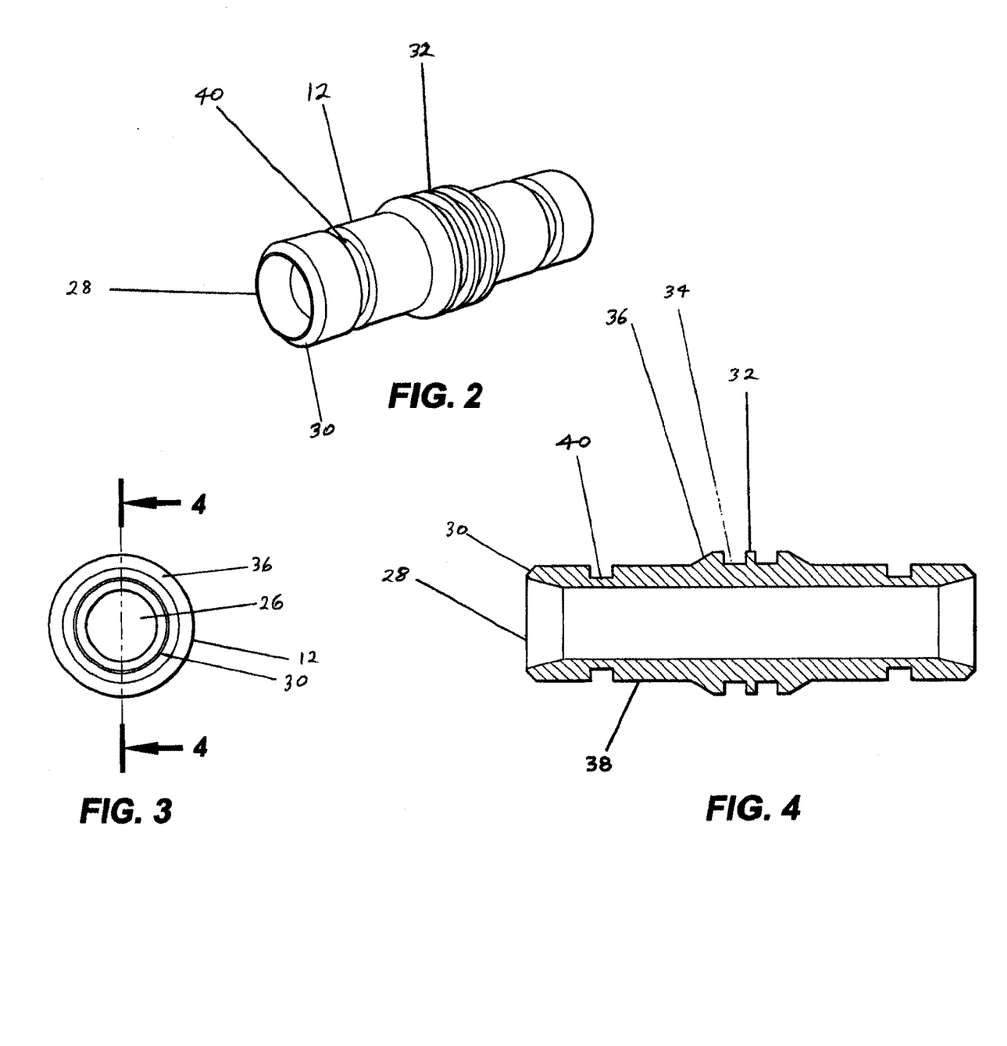
FIG. 2 is a perspective view of an integral pair of tubular bodies according to a preferred embodiment of the invention.
FIG. 3 is a view from one end of the body shown in FIG. 2.
FIG. 4 is a longitudinal cross-section along line A-A of FIG. 3.

In the exploded view the configurational relationship between the components of the preferred embodiment connection fitting can be seen. The terms "proximal", and "distal", in the above identification of the drawings and in the following description is used to indicate those ends of the components which are, respectively, closer to the mid-point of the pair of connection fittings 10, and further from the mid-point of the pair of connection fittings 10.

Tubular body 12, forming part of connection fitting 10b, is composed of a plastics material and has a uniform bore 26, the distal end 28 of which is chamfered 30. Adjacent the mid-point 32 of the integral pair of tubular bodies, i.e., at the proximal end of tubular body 12, there is provided, on the outer side 38 of tubular body 12, a collet-engaging channel 34 on the distal side of which is disposed a ramp 36. Both collet-engaging channel and ramp 36 circumscribe tubular body 12. Disposed on the outer side 38 and toward the distal end of tubular body 12 is an O-ring-engaging channel 40, which circumscribes the outer side 38.

The O-ring 14 is a typical O-ring, dimensioned to be engaged and restrained from movement by the O-ring-engaging channel 40. The distal end of the outer side 38 of the tubular body 12 is chamfered 30.

The collet 16 is comprised of spring steel. It is generally cylindrical and is provided with four slots 44 opening at the proximal end and an additional four slots 45 opening at the distal end, and four tabs 46 evenly spaced around the circumference. At the proximal end is provided an external flange 48 and an internally directed flange 49, both intersected by the proximally directed slots 44. The flange 48 is chamfered 50 on its proximal side. The internal wall 52 of the collet is chamfered 54 at its distal end 56.

The collet retainer 18 is also generally cylindrical and is composed of stainless steel. The distal end 58 is chamfered 60 into an opening 62 with a slightly narrower diameter than the bore 64 of the main part of the collet retainer 18. Four slots 66 are disposed circumferentially at even intervals around the body of the retainer 18.

Figure 17:
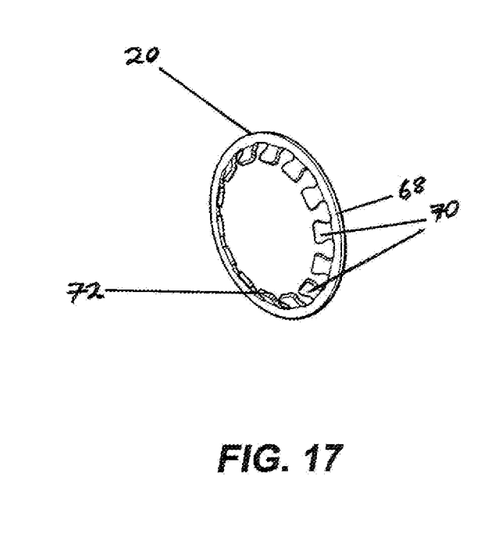
FIG. 17 is a perspective view from the proximal side of a grab ring according to a preferred embodiment of the invention.
Figure 18:
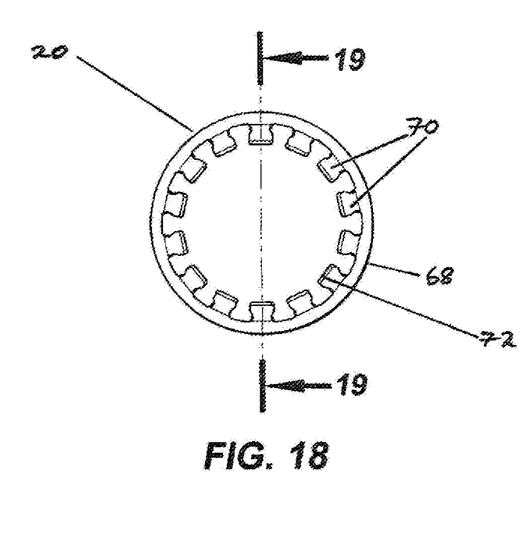
FIG. 18 is an end view from the proximal side of the grab ring shown in FIG. 17.
Figure 19:
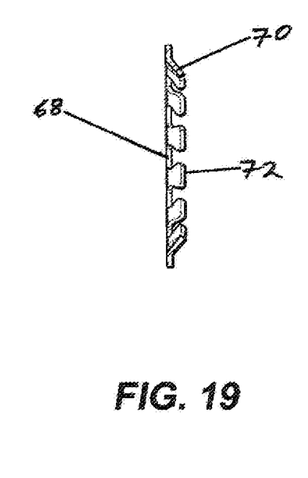
FIG. 19 is a side sectional view of the grab ring shown in FIG. 18.

Grab ring 20 is formed from spring steel and takes the form of a substantially angular ring 68 from which depends a plurality of radially inwardly extending teeth 70. The teeth 70 are spaced equal distantly around the inner edge of the ring 68. The grab ring 20 is initially formed as a flat blank. Then the teeth 70 are pushed out of the plane of the ring 68 so that they project in a proximal direction at an angle to the plane of the ring 68 with the innermost edges 72 of the teeth 70 being sharp to aid in engagement with the pipe or tube following insertion of the same into the connection fitting and thereby restrain the pipe or tube from being subsequently withdrawn from the connection fitting.

Figure 14:
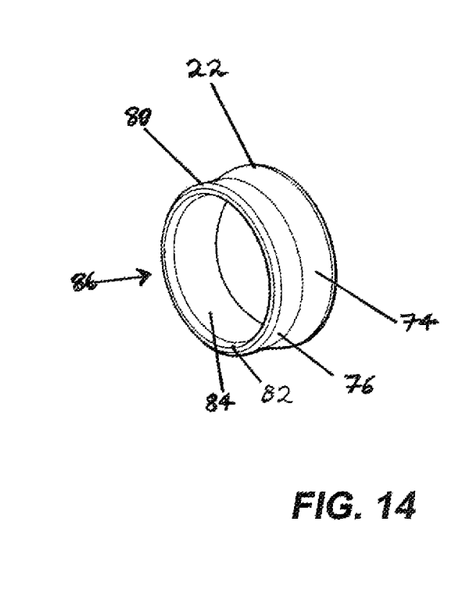
FIG. 14 is a perspective view from the distal end of a spacer ring according to a preferred embodiment of the invention.
Figure 15:
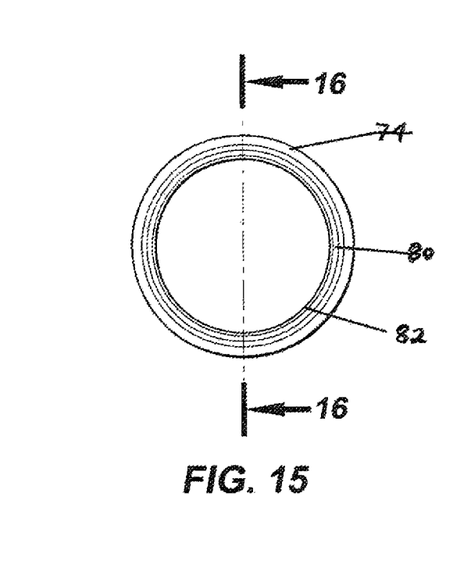
FIG. 15 is a view from the distal end of the spacer ring shown in FIG. 14.
Figure 16:
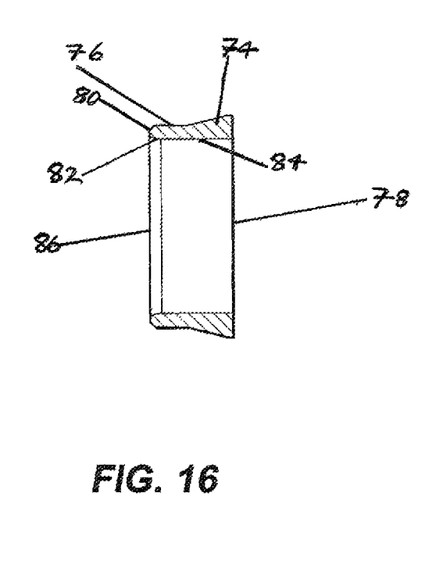
FIG. 16 is a longitudinal cross-section view along line A-A of FIG. 15.

The spacer ring 22 is formed from a plastics material. It is generally cylindrical with a ridge 74 being formed on the outer side 76 towards the proximal opening 78 and chamfers 80, 82 on the outer side 76 and inner side 84 at the distal opening 86. The diameter of the spacer ring 22 is otherwise constant.

Figure 20:
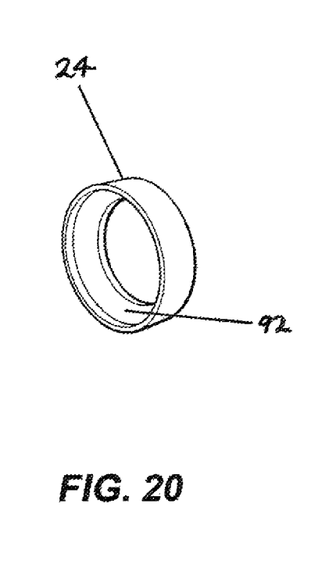
FIG. 20 is a perspective view from the distal end of a protection ring according to a preferred embodiment of the present invention.
Figure 21:
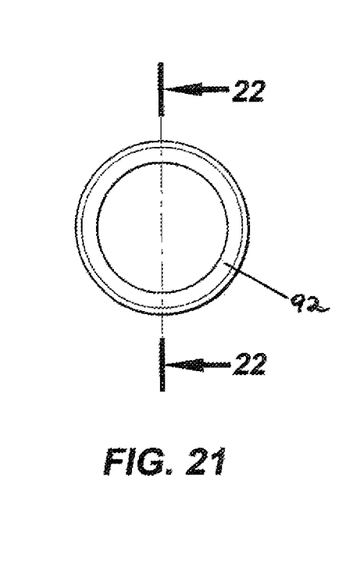
FIG. 21 is a view from the distal end of the protection ring shown in FIG. 20.
Figure 22:
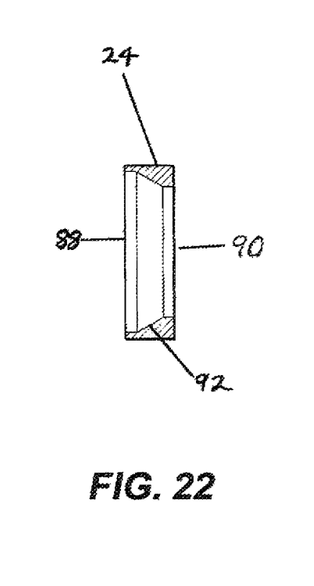
FIG. 22 is a sectional view along line A-A of FIG. 21.
Figure 23:
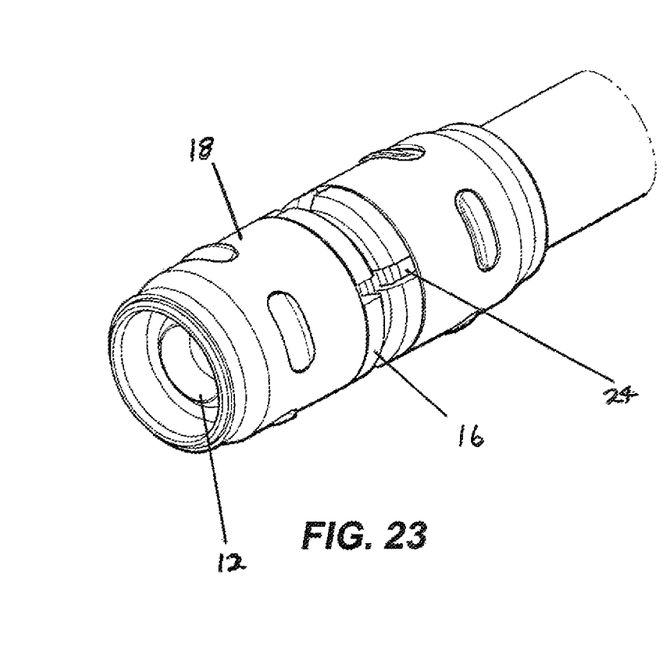
FIG. 23 is a perspective view of a pair of assembled connection fittings prior to connection of the left hand connection fitting to a pipe or tube.

The protection ring 24 is also generally cylindrical, although its internal diameter at the proximal end 88 is greater than at the distal end 90, there being a radially inwardly directed annular ramp 92 extending from a point adjacent the distal end 90 to a point adjacent the proximal end 88 of the protection ring 24, thereby defining two inner rings of differing diameters joined by a smooth ramp section. The protection ring is brightly coloured so as to provide a visual indication of the completion of the connection of a pipe to the connection fitting.

The assembly procedure starts with the locating of the O-ring 14 in the O-ring-engaging channel 40 on the tubular body 12. The collet 16 is then pushed on to the tubular body 12 until it engages ramp 36. As pushing continues the collet 16 rides up ramp 36 and the collet 16 expends via the four proximally-opening collet slots 44 until collet 16 reaches the collet-engaging channel 34 on the tubular body 12 whereupon the collet 16 ceases to expand and the internally directed flange 49 at the proximal end of collet 16 engages with, and is located in, the collet-engaging channel 34.

Figure 5:
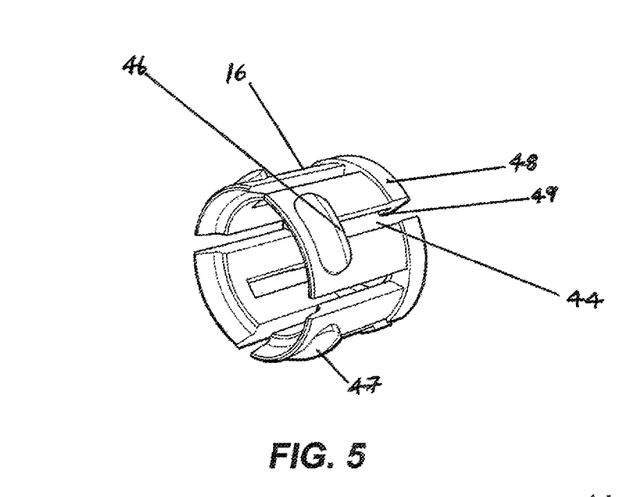
FIG. 5 is a perspective view from the distal end of a collet according to a preferred embodiment of the invention.
Figure 6:
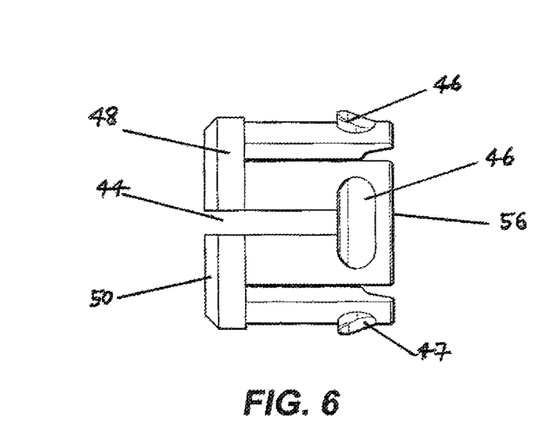
FIG. 6 is a side view of the collet shown in FIG. 5 with the distal end being on the right.
Figure 7:
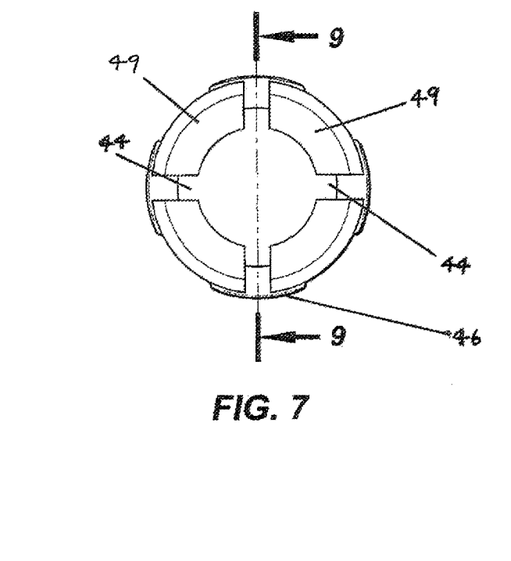
FIG. 7 is a view from the distal end of the collet shown in FIG. 5.
Figure 8:
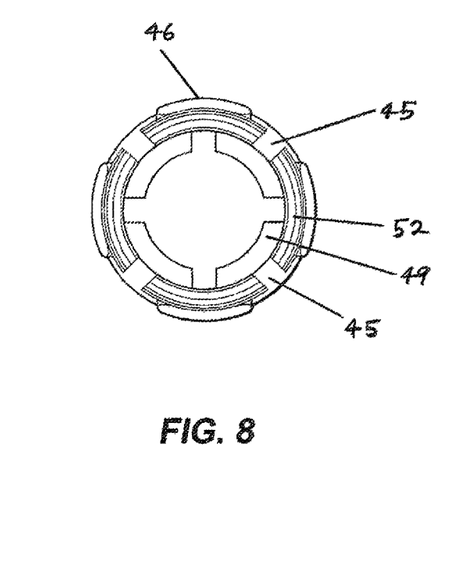
FIG. 8 is a view of the proximal end of the collet shown in FIG. 5.
Figure 9:
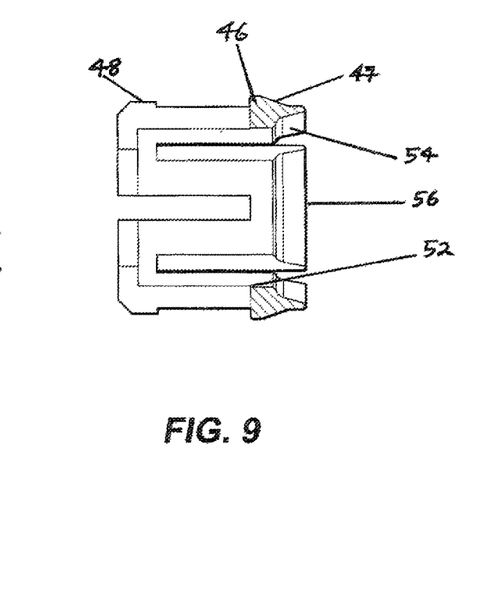
FIG. 9 is a longitudinal cross-section along line A-A of FIG. 8.
Figure 10:
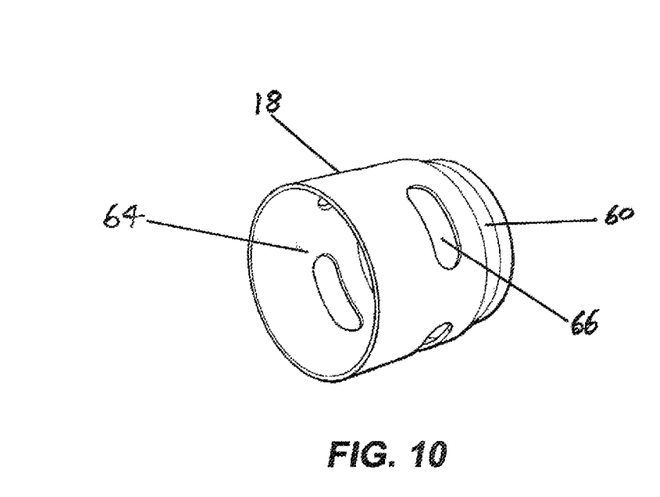
FIG. 10 is a perspective view from the proximal end of the collet retainer according to a preferred embodiment of the invention.
Figure 11:
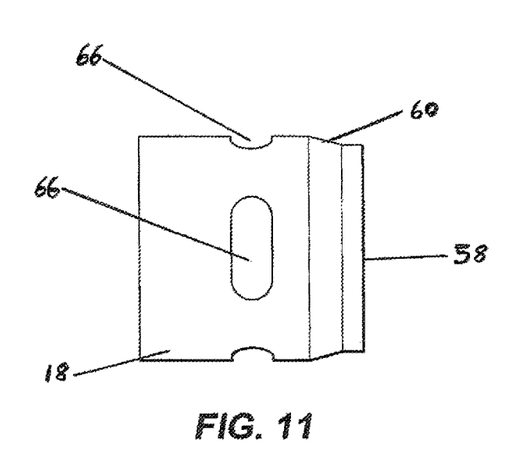
FIG. 11 is a side view of the collect retainer shown in FIG. 10 the distal end being on the right.
Figure 12:
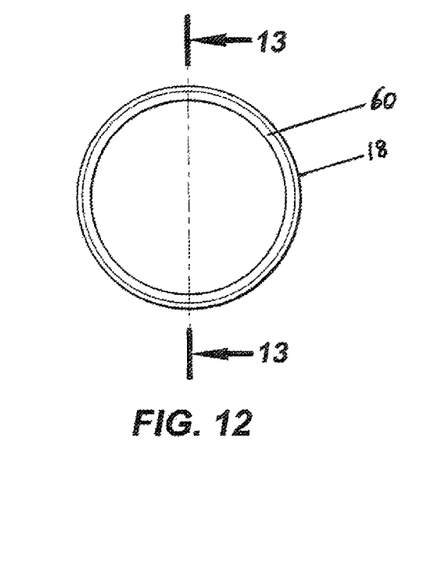
FIG. 12 is a view from the proximal end of the collet retainer shown in FIG. 10.
Figure 13:
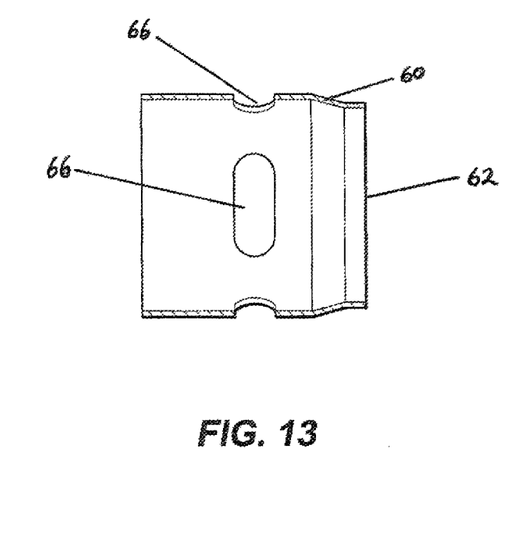
FIG. 13 is a longitudinal cross-section along line A-A of FIG. 12.

Spacer ring 22 and grab ring 20 are placed inside collet retainer 18, grab ring 20 being located proximally in relation to spacer ring 22. The resulting collet retainer assembly is then located onto the collet 16 and the bore 64 of the collet retainer 18 encompasses the outer side of collet 16. As a small amount of force is applied to push the collet retainer 18 onto the collet 16 the collet 16 compresses via the four distally-opening slots 45. Tabs 46 on the collect 16 are provided with ramps 47 (as can be seen in FIGS. 5, 6 and 9) which assist in this procedure by making it easier to push the collet retainer assembly onto collet 16. The collet retainer assembly is pushed onto collet 16 until the proximal end of the collet retainer 18 meets external flange 48 provided at the proximal end of collet 16. Keeping the collet 16 stationary, the collet retainer assembly is rotated around the collet 16 until the four collet tabs 46 click into the four collet retainer slots 66. Collet 16 is then allowed to expand and return to its pre-compression state. The collet retainer 18 is now locked onto collet 16 and has also locked collet 16 onto the tubular body 12. Spacer ring 22 and grab ring 20 are now secured inside the collet retainer 18.

Figure 24:
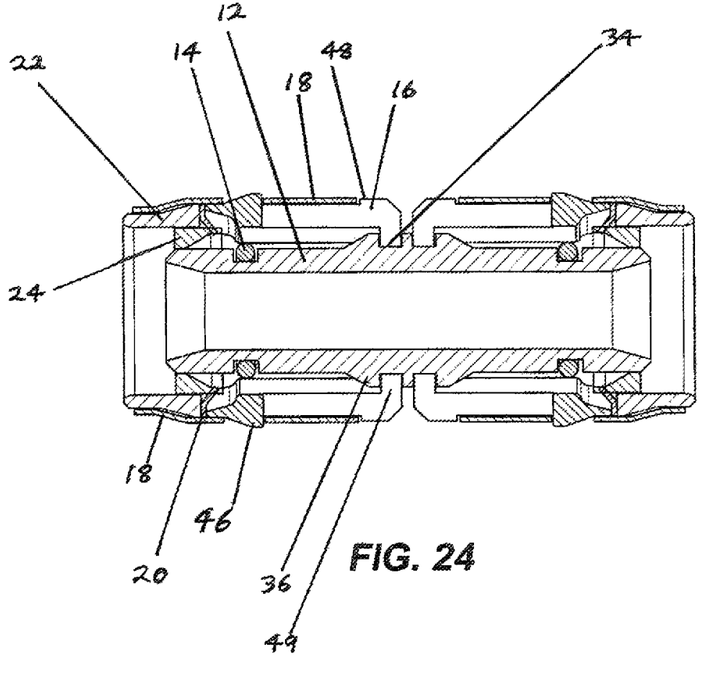
FIG. 24 is a longitudinal sectional view through the assembled pair of connection fittings of FIG. 23.

The protection ring 24 is pushed into and located within the spacer ring 22 and is pushed proximally with respect to the tubular body 12 until it reaches the grab ring 20 in the collet retainer assembly. The protection ring 24 has the same internal and external diameters as the pipe for which the connection fitting 10b is intended. This allows the grab ring 20 to grab the protection ring 24 and hold it in place until insertion of the pipe. The protection ring 24 also locates onto the tubular body 12 which assists in centering the collet 16, gab ring 20, spacer ring 22 and collet retainer 18 onto the tubular body 12. Further, the protection ring 24, by locating on tubular body 12 and being inside the spacer ring 22, protects the O-ring 14 from contamination by foreign matter prior to pipe insertion. FIG. 24 shows in cross-section an assembled pair of connection fittings 10 prior to pipe insertion.

Figure 25:
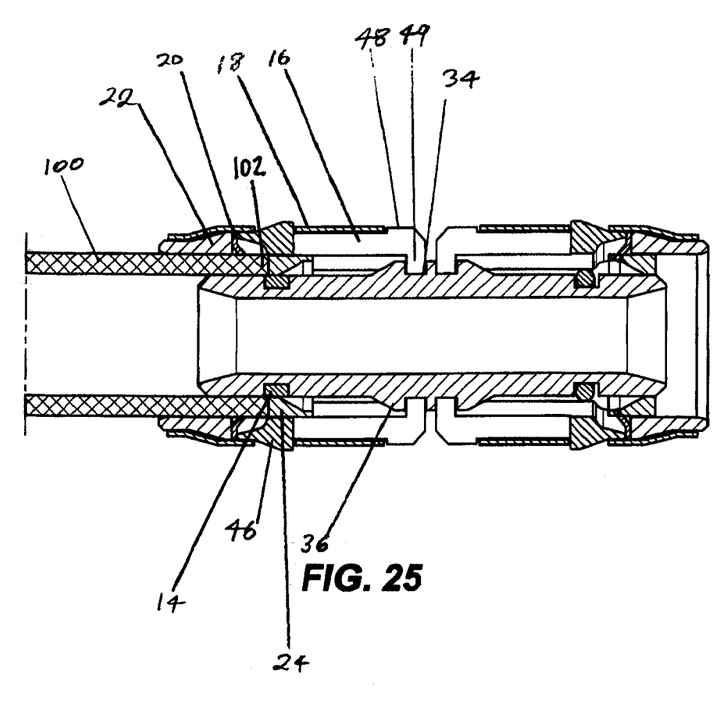
FIG. 25 is a longitudinal sectional view through the assembled pair of connection fittings during the process of connecting a pipe or tube to the left hand connection fitting.
Figure 26:
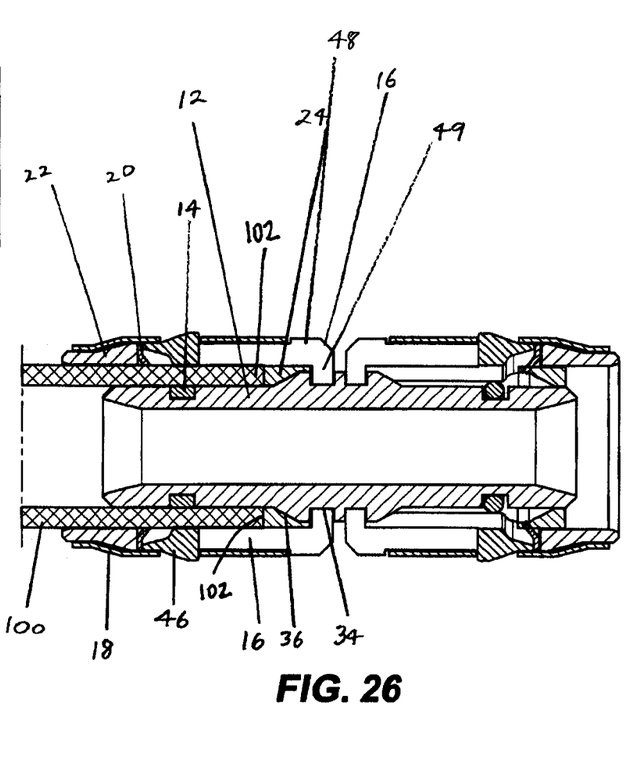
FIG. 26 is a longitudinal sectional view through the assembled pair of connection fittings at the completion of connection of a pipe or tube to the left hand connection fitting.

When a pipe is inserted the pipe 100 pushes on the distal end of the protection ring 24. As the protection ring 24 is moved proximally within the connection fitting it compresses O-ring 14 and permits the pipe 100 to ride more easily over the O-ring 14, without the need to chamfer the open end 102 of the pipe 100. As proximal movement of the protection ring 24 continues, due to further pushing of the pipe 100 into the connection fitting, the protection ring 24 continues to travel proximally until it meets the ramp 36 and can move no further. At this point the pipe has been inserted fully into the connection fitting. With the protection ring 24 being brightly coloured and resting against ramp 36 it becomes visible through the proximally opening slots 44 in the collet 16. This indicates that the pipe has been fully inserted into the connection fitting.

It is to be understood that the invention may embrace many further modifications as would be readily apparent to persons skilled in the art and which would be deemed to reside within the broad scope and ambit of the invention. The preferred embodiment described above is by way of example only and is not to be considered as limiting.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge.

The invention claimed is:

1. A connection fitting for a tube or pipe, comprising:
   a) a tubular body having a first end, a second end, and a bore which extends from the first end towards the second end, the tubular body having an outer surface with a circumferential channel and a collet engaging member, the tubular body being receivable within the tube or pipe;
   b) an O-ring mounted in the circumferential channel, the O-ring being adapted to enter into a sealing relationship with an inner surface of the tube or pipe;
   c) a substantially tubular, flexible and resilient collet having a first end and a second end, the second end of the collet operable to engage the collet engaging member to secure the collet to the tubular body;
   d) a substantially annular and resilient grab ring for gripping an outer surface of the tube or pipe, the grab ring being mounted adjacent the first end of the collet;
   e) a substantially tubular spacer ring mounted adjacent the grab ring;
   f) a collet retainer operable to engage the collet and thereby lock the collet to the tubular body, the collet retainer operable to maintain the grab ring and the spacer ring adjacent the first end of the collet; and
   g) a tubular protection ring mounted within the spacer ring, the protection ring having a chamfered second end to assist in the insertion of the tube or pipe into the connection fitting and onto the tubular body.

2. A connection fitting as claimed in claim 1, wherein the outer surface of the tubular body, inner and outer surfaces of the collet, and an inner surface of the collet retainer are circular in cross-section.

3. A connection fitting as claimed in claim 1, wherein the outer surface of the tubular body, inner and outer surfaces of the collet, and an inner surface of the collet retainer are polygonal in cross-section.

4. A connection fitting as claimed in claim 1 further comprising apertures in the collet retainer, wherein portions of the protection ring can be seen through the apertures after connection of the tube or pipe to the connection fitting is completed.

* * * * *

UNITED STATES PATENT AND TRADEMARK OFFICE
CERTIFICATE OF CORRECTION

PATENT NO. : 10,072,783 B2  
APPLICATION NO. : 15/105389  
DATED : September 11, 2018  
INVENTOR(S) : Jeremy Gledhill et al.

Page 1 of 1

It is certified that error appears in the above-identified patent and that said Letters Patent is hereby corrected as shown below:

In the Claims

Claim 4, Column 10, Line 20, delete "retainer"

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*